March 10, 1970   B. ZAHAYKEVICH   3,500,017
ELECTRIC HEATING APPARATUS AND ENCLOSURE THEREFOR
Filed June 22, 1967

INVENTOR.
BOHDAN ZAHAYKEVICH
BY Richard M. Rathkin
ATTORNEY

United States Patent Office 3,500,017
Patented Mar. 10, 1970

3,500,017
ELECTRIC HEATING APPARATUS AND ENCLOSURE THEREFOR
Bohdan Zahaykevich, Newark, N.J., assignor to Federal Pacific Electric Company, a corporation of Delaware
Filed June 22, 1967, Ser. No. 647,976
Int. Cl. F24h 9/02
U.S. Cl. 219—366     5 Claims

ABSTRACT OF THE DISCLOSURE

An electric heater of the type commonly installed against a wall along the baseboard including one section containing an elongated heating element and a small end section for terminal connections. Access to the terminal section is gained through a removable cover front to meet customary requirements. Avoiding the usual need for time-consuming disassembly of the front covers when connection is to be made from the rear, a separate cover is removable from the rear of the terminal box and has rear-accessible fastening means.

---

This invention relates to electric baseboard heating apparatus and to improved housings for such apparatus.

The utilization of electricity for heating has become more and more popular. Electric heat has numerous advantages over other forms of heating due to convenience afforded by room to room individual temperature control, the inherent safety of flameless heating and the ability to structure the heating system to meet the particular requirements of the area to be heated. The utility companies have promoted the use of electric heat in order to achieve load balance on their systems; economical rates have been granted to those installing electric heat.

In most electric heat installations, as for example, in the heating of a residence, multiple units are employed, i.e., each room within the home has a thermostat and one or more electric heating units. Such an installation may include a large number of baseboard heaters which are mounted on the walls. The use of baseboard heaters provides many advantages particularly where the spreading of heat along the walls is particularly beneficial.

Electric baseboard heaters are rated on a watts per foot basis. Once the required heat output is determined a baseboard heater of the proper length is selected. Where a large amount of heat is required the use of one long unit rather than several small units is preferred so as to reduce unit costs and installation labor. Electric basebord heaters are available in lengths of from two feet up to and including twelve feet. Baseboard heaters are deliberately made shallow in depth so as not to protrude unnecessarily into the room. They occupy, approximately, the same space that the standard baseboard, which they replace, would occupy. The depth of such units is in the neighborhood of 2½″ with an overall height of 7½″. The heater enclosure is usually fabricated from sheet steel. Therefore, it will be understood that a baseboard heater which is, for example, approximately 8′ long and 7½″ high and 2½″ deep would be a relatively willowy structure.

While short units have an integral wiring or terminal box at only one end, baseboard heaters 48″ long or longer have integral terminal boxes at the opposite ends of the unit in order to allow electrical connection to either end of the unit. transverse partition walls, within the heater enclosure, separate the terminal section of the unit from the section in which the heating element is mounted.

Baseboard heaters, because of their high current drain, are normally served by heavy conductor 220 v. wires protected by an armored cable or an insulating sheath.

In prior construction, well known in the art, the rear wall of the housing at terminal box section was provided with knockouts to allow entry of the power conductors for connection to the internal circuitry of the heater. This construction has certain disadvantages set out in detail below. Under safety requirements promulgated by Underwriters' Laboratories and other agencies it is required that the terminal box section have a front-mounted inner cover plate which covers the wiring connections when the snap-on cover member, which extends over the entire unit, is removed. Removal of the cover member exposes the heating element section for cleaning of the element while the cover plate over the junction box remains in place. In order to install long (48″ or longer) baseboard heaters of the prior construction described above it was necessary to partially disassemble the heater. First it was necessary to remove the snap-on unit cover exposing the terminal section cover which was then removed. An appropriate knockout in the rear wall of the enclosure at the terminal section was removed to provide a connection point for cable clamp. The clamp portion of the cable connector was secured to the cable and then the wires and the threaded portion of the connector were inserted into the rear wall of the enclosure through the knockout. The installer was forced to balance the unit on its narrowest side in order to thread the wires and connector through the knockout. The lock nut of the cable clamp was also mounted and secured in this position. All the while the installer was forced somehow to balance or prop up the long and willowy heater. This has proved to be particularly troublesome where the heater length was in excess of 4′. The difficulties were compounded when 8′ or longer units were being installed. The installation became extremely tedious, laborious and very often required the services of two men. One of the men being employed in balancing the heater in order to allow the second man to perform the various manipulations described. In any event once the cable clamp was secured to the housing of the heating it was then necessary for the installer to connect the power wires to the wiring terminals of the unit. This was done either before the unit was mounted on the wall, requiring the continuation of balancing as aforesaid, or if done when the unit was placed on the wall, required considerable agility on the part of the installer. Once the electrical connections were complete and the unit was affixed to the mounting surface as by multiple screws or nails it was then necessary to re-install the inner cover plate on the terminal section and the snap-on outer cover for the entire unit. It will be readily understood that a considerable amount of installation time was used on each unit that, when multiplied by the relatively large number of units employed in the residence, resulted in substantial costs to the owner or contractor.

It is an object of this invention to provide improved electric heat apparatus which obviates the aforementioned difficulties.

It is another object of this invention to provide an improved electric baseboard heater structure which results in reduction of installation problems.

It is still another object of this invention to provide an improved housing for surface mounted electric devices.

A further object of this invention is the provision of an improved surface mounted electric baseboard heater.

Briefly, the above and other objects and advantages of the invention are accomplished in one embodiment of the invention by the provision of an electric baseboard heater having a housing adapted for mounting on a surface wherein means defining an aperture in the rear wall of the housing is provided to afford access, only during installation, to the terminal section of the device. Means including a cover plate with knockouts thereon for receiving the branch circuit wiring to the device, is mounted on the rear wall of the enclosure overlying and completely closing the aperture. The cover plate is removable from the rear wall of the enclosure only until the heater is mounted on the surface. Once the heater is in position the cover plate is nonremovable from the enclosure.

Other objects, advantages, and novel features of the invention will become apparent from the consideration of the following description when taken in conjunction with the drawings in which.

Figure 1:
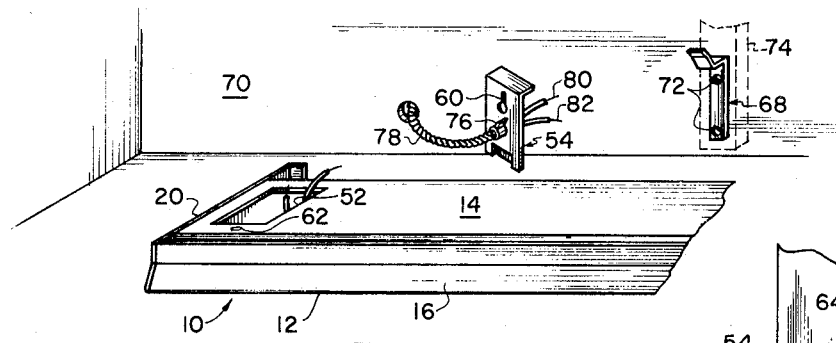
FIG. 1 is a general perspective view of a portion of a baseboard heater incorporating one embodiment of the invention, prior to installation.
Figure 2:
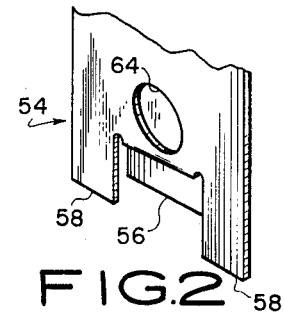
FIG. 2 is a perspective view of a portion of the rear cover plate.
Figure 4:
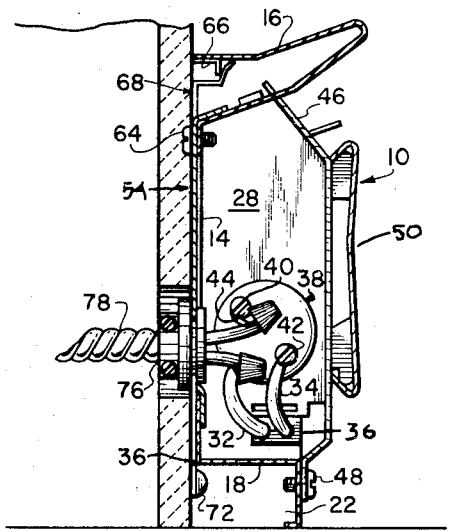
FIG. 4 is a sectional view through the terminal section of the baseboard heater of FIG. 1 in its installed condition, viewed along the plane 4—4 of FIG. 5.
Figure 3:
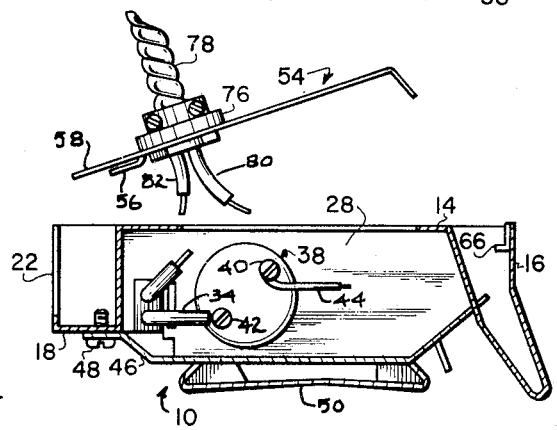
FIG. 3 is a partial section of the baseboard heater of FIG. 1 through the terminal section with some parts broken away and other parts omitted in the interest of clarity.
Figure 5:
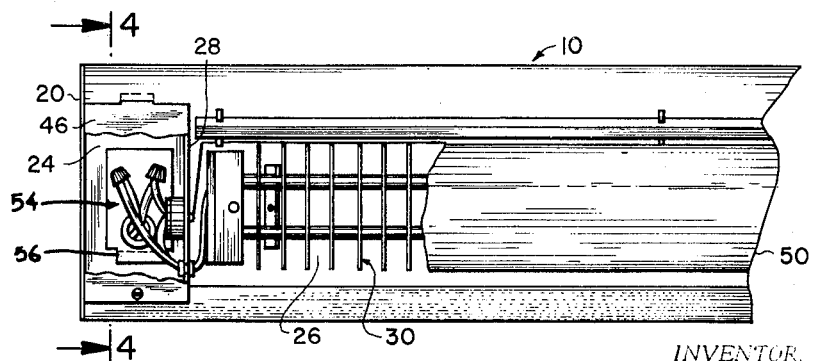
FIG. 5 is a front end view of a baseboard heater of FIG. 1 and 4 in the installed condition.

Referring to the drawing the baseboard heater 10 includes a housing or enclosure 12 having rear wall 14, formed opposed side walls 16, 18 and end walls 20, 22. The enclosure 12 is divided into a terminal section 24 and a heater section 26 by a transverse partition wall 28 that is secured to the opposed side walls 16, 18. A well-known finned resistance-type heating element 30 is mounted in the heater section. Electrical connection is made to the resistance element 30 by lead wires 32, 34 that pass through an insulating grommet 36 mounted in the partition wall. Details of grommet and of the heating element mounting structure may be obained from my copending application entitled "Insulating Strain Relief Grommet" Ser. No. 617,560 filed Feb. 21, 1967. An overtemperature protector 38, commonly known in the art as a linear thermal protector is mounted on the partition wall with the terminals 40, 42 thereof in the wiring section 24 of the enclosure. Lead wire 34 is connected to terminal 42 and wire 44 is connected to the other terminal 40. The terminal section 24 is provided with an inner cover plate 46 which engages one side wall 16 of the enclosure and is secured by fastening means 48 to the opposed side wall 18. The enclosure is further provided with a snap-on cover 50 which extends the full length of the heater 10 overlying the inner cover plate 46 over the terminal section 24 and the heating element in the heater section 26 of the enclosure.

A large aperture 52 which opens a substantial portion of the terminal section 24 for easy manual access is provided in the rear wall 14 of the enclosure 12. Aperture 52 is closed during shipment and after installation by an overlying cover plate 54 that is larger in all dimensions than the aperture. A portion of the lower edge of the rear cover plate is displaced, as by lancing, to provide a first tongue 56 which is displaced from the plane of the cover plate, and a pair of spacer retainers 58. When the rear cover plate is in position the tongue 56 is on the interior face of the rear wall while retainers 58 and the peripheral positions of the plate are on the outside surface of the wall. The cover plate 54 is further provided with a key-shaped slot 60 which, in the installed condition, is in registration with a hole 62 provided for receiving a self-tapping sheet metal screw 64. Further, the rear cover plate 54 is provided with at least one knockout 64 for the reception of a well-known cable connector.

A hanger in the form of a longitudinally extending angle 66 is secured to side wall 16 for cooperation with a wall mounted bracket 68 for positioning and mounting the baseboard heater on wall 70. Referring particularly to FIG. 1 the bracket is mounted, as by screws 72, on stud 74 located behind the wall prior to the installation of the heater.

In installing the heater the unit is placed face down on the floor adjacent the wall surface 70 on which it is to be mounted. Cable clamp 76 is secured to the cable 78 which runs within the wall and extends from a hole in the wall. The rear cover plate 54 is released from the enclosure by loosening screw 64 and sliding the cover plate along the surface of the enclosure wall 14. Knockout 64 is easily removed from the rear cover plate and the cable clamp is secured therethrough as shown in the drawings. The wires 80, 82 of the cable are then connected to the internal wires 32, 44 of the heater as by screw-on pressure type connectors within the heater. The cover plate 54 is then placed on the heater and slid into position with the rear wall edge portion received between the tongue 56 and the retainers 58. Cover plate 54 is then secured to the rear wall by screw 64, which once the heater is mounted, is no longer accessible. The heater is then hung on bracket 68 by engagement thereof with the hanger 66 and is secured in position by screws, not shown. The angle 66 is at least as long as the inter-stud spacing (approximately 16″ center-to-center) so that the heater may be positioned with ease with respect to the cable 78 and the bracket 68. It will be noted that during the foregoing installation, which is now complete, it was not necessary for the installer to move any of the front cover plates or to manipulate the baseboard heater to any great extent. In accordance with customary practice, cover plate 46 is removable for providing access at the front to the wiring in the interior of terminal section 24. The novel construction described above results in greatly increased productivity of the installer and therefore greatly reduced costs.

While the embodiment of the invention shown has been particularly directed to a mounting of electric baseboard heaters it will be readily understood by those skilled in the art that other similarly awkward or willowy housings may be secured to cables and the like by various modifications and variations of the described invention without departing from its spirit or scope.

What I claim is:

1. An electric heater for mounting on a flat wall-surface of a building from which an electric power cable may project, said device including a housing having a generally flat rear wall adapted for flush mounting against the flat wall-surface of the building, means dividing said housing into a terminal box section and an apparatus section, an electric heating element mounted in said appapartus section and having terminal connecting portions in said terminal box section, an aperture in said rear wall of said housing in said terminal box section providing manual access to the interior of said terminal box section and to said terminal connecting portons, a cover plate having means manually operable from the rear of the enclosure for securing the cover plate to said rear wall and thereby effectively closing said aperture, said rear cover plate being esentially free of projecting structure extending to the rear of said generally flat rear wall of the housing and being provided with a knockout that is removable for receiving and mounting a pass-through power cable connector, said rear cover plate being nonremovable when said housing is mounted on the flat wall-surface, and a front cover plate overlying said terminal box section and being removable for providing manual access to said terminal connecting portions from the front of said housing.

2. An electric heater according to claim 1 wherein said manually operable securing means for said cover plate includes at least one threaded fastener engageable and releasable from the rear of said housing and arranged to liberate the cover plate for removal from the housing from the rear thereof.

3. An electric heater according to claim 1 wherein said cover plate includes, along one edge thereof, mutually offset portions that extend along the inside surface and along the outside surface of said rear wall of said housing adjacent said aperture, and wherein said cover plate securing means includes a threaded fastener that has a manipulable portion exposed from the rear of said enclosure.

4. An electric heater according to claim 1 wherein said housing is greatly elongated compared to its width and to its front-to-rear dimensions and includes a second front cover providing a passage into and from said housing for flow of air heated by said heating element.

5. An electric baseboard heater for mounting against a flat wall-surface of a building from which an electric power cable may project, said heater including an elongated housing having opposed relatively short side walls and a generally flat rear wall that is relatively elongated and adapted for flush mounting against the flat wall-surface of the building, and an elongated electrically operated heating element mounted within said housing, dividing means adjacent one side wall dividing the housing into a terminal box section and a heating element section, said electric heating element being mounted in said heating element section, terminal wires in said terminal box section connected to said electric heating element and having free ends for connection to an electric power cable, an aperture in said rear wall of said housing in said terminal box section and to said terminal wires, a cover plate having means manually engageable and operable from the rear of the enclosure for securing the cover plate to said rear wall and thereby effectively closing said aperture, said rear cover plate being essentially free of projecting structure extending to the rear of said generally flat rear wall of the housing to accommodate flush mounting of the heater against the building wall and said rear cover being provided with a knockout that is removable for receiving and mounting a pass-through power cable connector, said rear cover plate being nonremovable when said housing is mounted on said flat wall-surface, a first removable front cover plate overlying the terminal box section and having manually operable securing means engageable from the front of the housing for providing manual access to said terminal wires from the front of said housing, and a removable second front cover plate overlying said heating element and said first front cover plate.

References Cited

UNITED STATES PATENTS

| | | | |
|---|---|---|---|
| 2,667,368 | 1/1954 | Ferguson | 174—65 X |
| 3,165,624 | 1/1965 | Cunningham | 219—365 |
| 3,051,816 | 8/1962 | Knoll et al. | 219—365 |
| 3,211,889 | 10/1965 | McEachron | 219—345 |

FOREIGN PATENTS 237,681   2/1962   Australia.

JOSEPH V. TRUHE, Primary Examiner

MARTIN C. FLIESLER, Assistant Examiner

U.S. Cl. X.R.

174—65; 219—342; 220—18